United States Patent
Ucar et al.

(10) Patent No.: US 12,522,218 B2
(45) Date of Patent: Jan. 13, 2026

(54) SYSTEMS, METHODS, AND VEHICLES FOR CLASSIFYING DRIVING BEHAVIOR OF A TARGET VEHICLE

(71) Applicant: Toyota Motor Engineering & Manufacturing North America, Inc., Plano, TX (US)

(72) Inventors: Seyhan Ucar, Mountain View, CA (US); Tomohiro Matsuda, Mountain View, CA (US); Yongkang Liu, Mountain View, CA (US); Emrah Akin Sisbot, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha (JP)

( * ) Notice: Subject to any disclaimer, the term of this patent is extended or adjusted under 35 U.S.C. 154(b) by 513 days.

(21) Appl. No.: 17/860,154

(22) Filed: Jul. 8, 2022

(65) Prior Publication Data

US 2024/0010203 A1    Jan. 11, 2024

(51) Int. Cl.
*B60W 40/04* (2006.01)
*B60Q 1/50* (2006.01)
(Continued)

(52) U.S. Cl.
CPC ............ *B60W 40/04* (2013.01); *B60Q 1/544* (2022.05); *B60W 50/14* (2013.01); *H04W 4/46* (2018.02);
(Continued)

(58) Field of Classification Search
CPC ................ B60W 40/04; B60W 50/14; B60W 2050/146; B60W 2554/4045;
(Continued)

(56) References Cited

U.S. PATENT DOCUMENTS 6,392,564 B1    5/2002  Mackey et al.
10,347,127 B2   7/2019  Drz et al.
(Continued)

FOREIGN PATENT DOCUMENTS

| CN | 105303690 A | 2/2016 |
|----|-------------|--------|
| JP | 3950393 B2  | 8/2007 |
| JP | 2021117833 A | 8/2021 |

OTHER PUBLICATIONS

Abnormal Driving Behaviors Detection and Identification Using Smartphone Sensors, "D3: Abnormal driving behaviors detection and identification using smartphone sensors," Zhongyang Chen et al., 2015 12th Annual IEEE International Conference on Sensing, Communication, and Networking (SECON), 2015.

*Primary Examiner* — Anne Marie Antonucci
*Assistant Examiner* — Luis G Del Valle
(74) *Attorney, Agent, or Firm* — Dinsmore & Shohl LLP

(57) ABSTRACT

Systems, methods, and vehicles for classifying driving behavior of a target vehicle are provided. The systems include a controller programmed to identify a target vehicle associated with a pseudo-id, obtain a first tag representing first driving behavior of the target vehicle during a first period of time along with the pseudo-id based on first motion data of the target vehicle, obtain a second tag representing second driving behavior of the target vehicle during a second period of time along with the pseudo-id based on second motion data of the target vehicle, the second period of time being after the first period of time, and classify driving behavior of the target vehicle based on interpretation of the first tag and the second tag.

14 Claims, 6 Drawing Sheets

(51) Int. Cl.
*B60W 50/14* (2020.01)
*H04W 4/46* (2018.01)

(52) U.S. Cl.
CPC ............... *B60W 2050/146* (2013.01); *B60W 2554/4045* (2020.02); *B60W 2554/4046* (2020.02); *B60W 2556/65* (2020.02)

(58) Field of Classification Search
CPC ..... B60W 2554/4046; B60W 2556/65; B60W 2556/10; B60Q 1/544; H04W 4/46; G08G 1/167
See application file for complete search history.

(56) References Cited

U.S. PATENT DOCUMENTS

| | | | | |
|---|---|---|---|---|
| 10,748,419 | B1* | 8/2020 | Fields | G08G 1/166 |
| 10,991,252 | B2 | 4/2021 | Fan et al. | |
| 11,393,264 | B1* | 7/2022 | Nakashima | G07C 5/0816 |
| 2019/0084532 | A1* | 3/2019 | Qiao | B60T 8/17558 |
| 2019/0213684 | A1 | 7/2019 | Sundar et al. | |
| 2019/0333381 | A1* | 10/2019 | Shalev-Shwartz | B60W 50/10 |
| 2021/0053616 | A1* | 2/2021 | Funke | G05D 1/0088 |
| 2021/0163021 | A1* | 6/2021 | Frazzoli | B60W 50/023 |
| 2021/0200212 | A1* | 7/2021 | Urtasun | G05D 1/0214 |
| 2021/0200231 | A1* | 7/2021 | Zhu | B60W 30/181 |
| 2021/0221382 | A1 | 7/2021 | Ucar et al. | |
| 2022/0258728 | A1* | 8/2022 | Heirung | B60W 40/04 |
| 2023/0166764 | A1* | 6/2023 | Johnson | G06Q 10/047 |
| | | | | 701/23 |

* cited by examiner

SYSTEMS, METHODS, AND VEHICLES FOR CLASSIFYING DRIVING BEHAVIOR OF A TARGET VEHICLE

TECHNICAL FIELD

The present disclosure relates to systems, methods, and vehicles for classifying driving behavior of a target vehicle.

BACKGROUND

It may be desirable for a number of reasons to detect abnormal driving (e.g., aggressive driving, distracted driving, reckless driving, and the like), and inform nearby drivers.

In general, conventional systems and methods detect abnormal driving of an ego vehicle. However, these systems and methods may not help when other vehicles are behaving abnormally. Further, some conventional systems and methods may detect abnormal other nearby vehicles based on specific thresholds, events, or signals. However, these systems and methods may be inaccurate due to focusing on only specific thresholds. For example, these systems and methods classify honking or an evasive maneuver, which is a maneuver that drivers perform to get rid of risky situations, as abnormal driving behaviors.

Accordingly, a need exists for systems, methods, and vehicles that classify detected driving behaviors of a target vehicle as abnormal driving behaviors with improved accuracy and output an alert about the abnormal driving behavior of the target vehicle to an ego vehicle to mitigate situations caused by these driving behaviors of the target vehicle.

SUMMARY

The present disclosure provides systems, methods, and vehicles for classifying driving behavior of a target vehicle, which classify detected driving behaviors of target vehicle as abnormal driving behaviors with improved accuracy and output an alert about the abnormal driving behavior of the target vehicle to an ego vehicle to mitigate caused by these driving behaviors. The systems, methods, and vehicles obtain at least two tags, which are consecutive, representing driving behavior of a target vehicle. The systems, methods, and vehicles classify driving behavior of the target vehicle based on interpretation of the at least two tags, which are consecutive. For example, the driving behavior of the target vehicle may be classified as abnormal driving behavior in response to determined that each of the first tag and the second tag matches one of predetermined movement patterns, such as, nudging followed by lane changes, nudging followed by cutting-in lane, nudging followed by another nudging, having a long distance to collision followed by a short distance to collision, frequent lane changes, weaving in a lane, and short-term lane swerving. The systems, methods, and vehicles inform a driver of the ego vehicle about the abnormal driving behavior of a target vehicle right away, before any abnormal events, such as vehicle collisions, happen, thereby providing correct driving behavior information of the target vehicle to a driver of the ego vehicle with enough time to avoid an undesirable situation.

In one embodiment, a system for classifying driving behavior of a target vehicle is provided. The system includes a controller programmed to identify a target vehicle associated with a pseudo-id, obtain a first tag representing first driving behavior of the target vehicle during a first period of time along with the pseudo-id based on first motion data of the target vehicle, obtain a second tag representing second driving behavior of the target vehicle during a second period of time along with the pseudo-id based on second motion data of the target vehicle, the second period of time being after the first period of time; and classify driving behavior of the target vehicle based on interpretation of the first tag and the second tag.

In another embodiment, a method for classifying driving behavior of a target vehicle is provided. The method includes identifying a target vehicle associated with a pseudo-id, obtaining a first tag representing first driving behavior of the target vehicle during a first period of time along with the pseudo-id based on first motion data of the target vehicle, obtaining a second tag representing second driving behavior of the target vehicle during a second period of time along with the pseudo-id based on second motion data of the target vehicle, the second period of time being after the first period of time, and classifying driving behavior of the target vehicle based on interpretation of the first tag and the second tag.

In yet another embodiment, a vehicle for classifying driving behavior of a target vehicle is provided. The vehicle includes an actuator, one or more sensors, and a controller. The actuator is configured to move the vehicle. The controller is programmed to associate the target vehicle with a pseudo-id, obtain a first tag representing first driving behavior of the target vehicle during a first period of time along with the pseudo-id based on first motion data of the target vehicle, obtain a second tag representing second driving behavior of the target vehicle during a second period of time along with the pseudo-id based on second motion data of the target vehicle, the second period of time being after the first period of time, and classify driving behavior of the target vehicle based on interpretation of the first tag and the second tag.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and vehicles for classifying driving behavior of a target vehicle, which classify detected driving behaviors of target vehicle as abnormal driving behaviors with improved accuracy and output an alert about the abnormal driving behavior of the target vehicle to an ego vehicle to mitigate situations caused by these driving behaviors of the target vehicle.

Figure 1A:
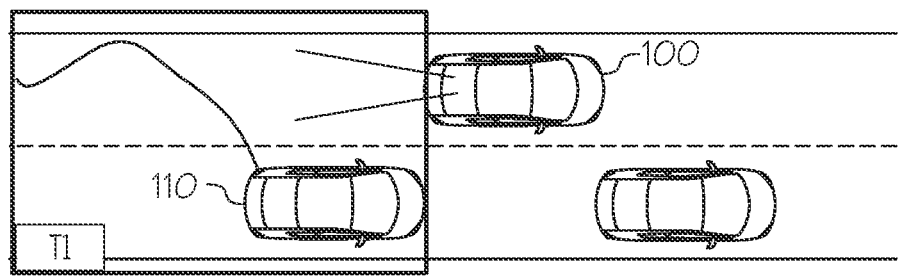
FIGS. 1A and 1B schematically depict an exemplary embodiment of classifying driving behavior of a target vehicle where the first driving behavior of a target vehicle is related to nudging followed by changing lanes and the second driving behavior of a target vehicle is related to nudging followed by frequent lane changes, according to one or more embodiments shown and described herein.
Figure 1B:
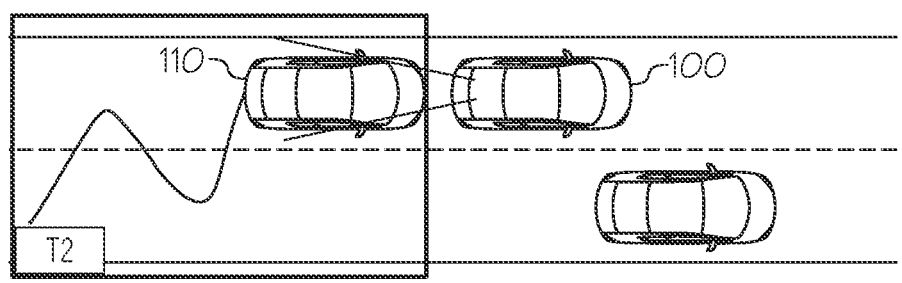

FIGS. 1A and 1B schematically depict an exemplary embodiment of classifying driving behavior of a target vehicle where the first driving behavior of a target vehicle is related to nudging followed by changing lanes and the second driving behavior of a target vehicle is related to nudging followed by frequent lane changes.

Referring to FIGS. 1A and 1B, the ego vehicle 100 may identify a target vehicle 110 associated with a pseudo-id. In embodiments, the pseudo-id may include one or more features of the target vehicle 110, e.g., a color, a model, and a type of the target vehicle 110. Each of the ego vehicle 100 and the target vehicle 110 may be a vehicle including an automobile or any other passenger or non-passenger vehicle such as, for example, a terrestrial, aquatic, and/or airborne vehicle. In some embodiments, each of the ego vehicle 100 and the target vehicle 110 may be an autonomous driving vehicle. The ego vehicle 100, the target vehicle 110, or both, may be an autonomous and target vehicle that navigates its environment with limited human input or without human input. The ego vehicle 100, the target vehicle 110, or both, may be equipped with internet access and share data with other devices both inside and outside the ego vehicle 100, the target vehicle 110, or both. The ego vehicle 100, the target vehicle 110, or both, may communicate with the server 240 and transmit their data to the server 240. For example, the ego vehicle 100, the target vehicle 110, or both, transmits information about its repetitive driving patterns, its current location and destination, information about a current driver, information about a task that it is currently implementing, and the like.

Each of the ego vehicle 100 and the target vehicle 110 may include an actuator 101 configured to move each of the ego vehicle 100 and the target vehicle 110. The ego vehicle 100 may detect the presence of the target vehicle 110 using one or more sensors. In some embodiments, the one or more sensors may be included in the ego vehicle 100, a device of a driver of the ego vehicle 100, or both. The device of the driver of the ego vehicle 100 may include a smartphone, a smartwatch, a laptop, a tablet computer, a personal computer, and a wearable device, or combinations thereof.

The one or more sensors may be any device having an array of sensing devices capable of detecting radiation in an ultraviolet wavelength band, a visible light wavelength band, or an infrared wavelength band. In some embodiments, one or more optical components, such as a mirror, fish-eye lens, or any other type of lens may be optically coupled to the one or more sensors. The one or more sensors may include one or more LIDAR sensors, radar sensors, sonar sensors, cameras, or other types of sensors for gathering data that could be integrated into or supplement the data collection.

Still referring to FIGS. 1A and 1B, the target vehicle 110 may come up behind the ego vehicle 100. The ego vehicle 100 may obtain at least two tags representing driving behaviors of the target vehicle 110. The ego vehicle 100 obtains a first tag T1 and a second tag T2. The first tag T1 represents first driving behavior of the target vehicle 110 during a first period of time along with the pseudo-id based on first motion data of the target vehicle 110. The second tag T2 represents second driving behavior of the target vehicle 110 during a second period of time along with the pseudo-id based on second motion data of the target vehicle 110, the second period of time being after the first period of time. The first tag T1 and the second tag T2 may be consecutive. Each of the first driving behavior and the second driving behavior may include a distance between the ego vehicle 100 and the target vehicle 110, a speed of the target vehicle 110, an acceleration of the target vehicle 110, a maneuver of the target vehicle 110, or combinations thereof. In embodiments, the second driving behavior may be different from the first driving behavior. In embodiments, the second driving behavior may be the same as the first driving behavior. In embodiments, the second period of time may be longer than the first period of time. In embodiments, the second period of time may be shorter than or the same as the first period of time.

In some embodiments, the first tag T1 and the second tag T2 may be transferred from the rear-side of the ego vehicle 100 to the front-side of the ego vehicle 100 back and forth. In some embodiments, the first tag T1 and the second tag T2 may be transferred from the ego vehicle 100 to other nearby vehicle, e.g., another vehicle in FIG. 6B, through vehicle-to-X communication. The communication may be direct over a cloud server. This transfer may shorten classifying driving behaviors of the target vehicle 110 as abnormal driving behavior.

Referring to FIG. 1A, the ego vehicle 100 obtains the first tag T1 representing first driving behavior of the target vehicle 110 during a first period of time along with the pseudo-id based on first motion data of the target vehicle 110. The first driving behavior of the target vehicle 110 may be related to nudging followed by changing lanes from a current lane to another lane. The first motion data of the target vehicle 110 may be captured by one or more sensors of the ego vehicle 100. The first motion data of the target vehicle 110 may be captured by the one or more sensors of the ego vehicle 100 disposed of rear-side of the ego vehicle 100. The first motion data of the target vehicle 110 may be captured during a first period of time. The first motion data of the target vehicle 110 may be captured by the one or more sensors of the ego vehicle 100 disposed of rear-side of the ego vehicle 100. Referring to FIG. 1B, the ego vehicle 100 obtains the second tag T2 representing second driving behavior of the target vehicle 110 during a second period of time along with the pseudo-id based on second motion data of the target vehicle 110. The second driving behavior of the target vehicle 110 may be related to nudging followed by frequent lane changes. The second motion data of the target vehicle 110 may be captured by one or more sensors of the ego vehicle 100. The second motion data of the target vehicle 110 may be captured by the one or more sensors of the ego vehicle 100 disposed of rear-side of the ego vehicle 100. The second motion data of the target vehicle 110 may be captured during a second period of time.

Referring back to FIGS. 1A and 1B, the ego vehicle 100 classifies driving behavior of the target vehicle 110 based on interpretation of the first tag T1 and the second tag T2. The driving behavior of the target vehicle 110 includes the first driving behavior of the target vehicle 110 and the second driving behavior of the target vehicle 110. The ego vehicle 100 classifies the driving behavior of the target vehicle 110 as abnormal driving behavior in response to determining that each of the first tag T1 and the second tag T2 matches with one of predetermined movement patterns. In some embodiments, the first tag T1 and the second tag T2 may be transferred from the ego vehicle 100 to a cloud server through vehicle-to-cloud communication. This cloud server may classify driving behaviors of the target vehicle 110 as abnormal driving behavior. The predetermined movement patterns may include nudging followed by lane changes, nudging followed by cutting-in lane, nudging followed by another nudging, having a long distance to collision followed by a short distance to collision, frequent lane changes, weaving in a lane, and short-term lane swerving. The predetermined movement patterns may be characterized based on a location, a size of the target vehicle, a color of the target vehicle, a speed of the target vehicle, or combinations thereof. The predetermined movement patterns may be stored in the ego vehicle 100 or in an external device such as a cloud server or an edge device that the ego vehicle 100 may access. By referring to FIGS. 1A and 1B, the predetermined movement patterns may include nudging followed by changing lanes and nudging followed by frequent lane changes. The first tag T1 matches the predetermined movement pattern, nudging followed by changing lanes. The second tag T2 matches the predetermined movement pattern, nudging followed by frequent lane changes. In response to matching the first tag T1 and the second tag T2 with the predetermined movement patterns, the ego vehicle 100 may classify the driving behavior of the target vehicle 110 as abnormal driving behavior.

Figure 2:
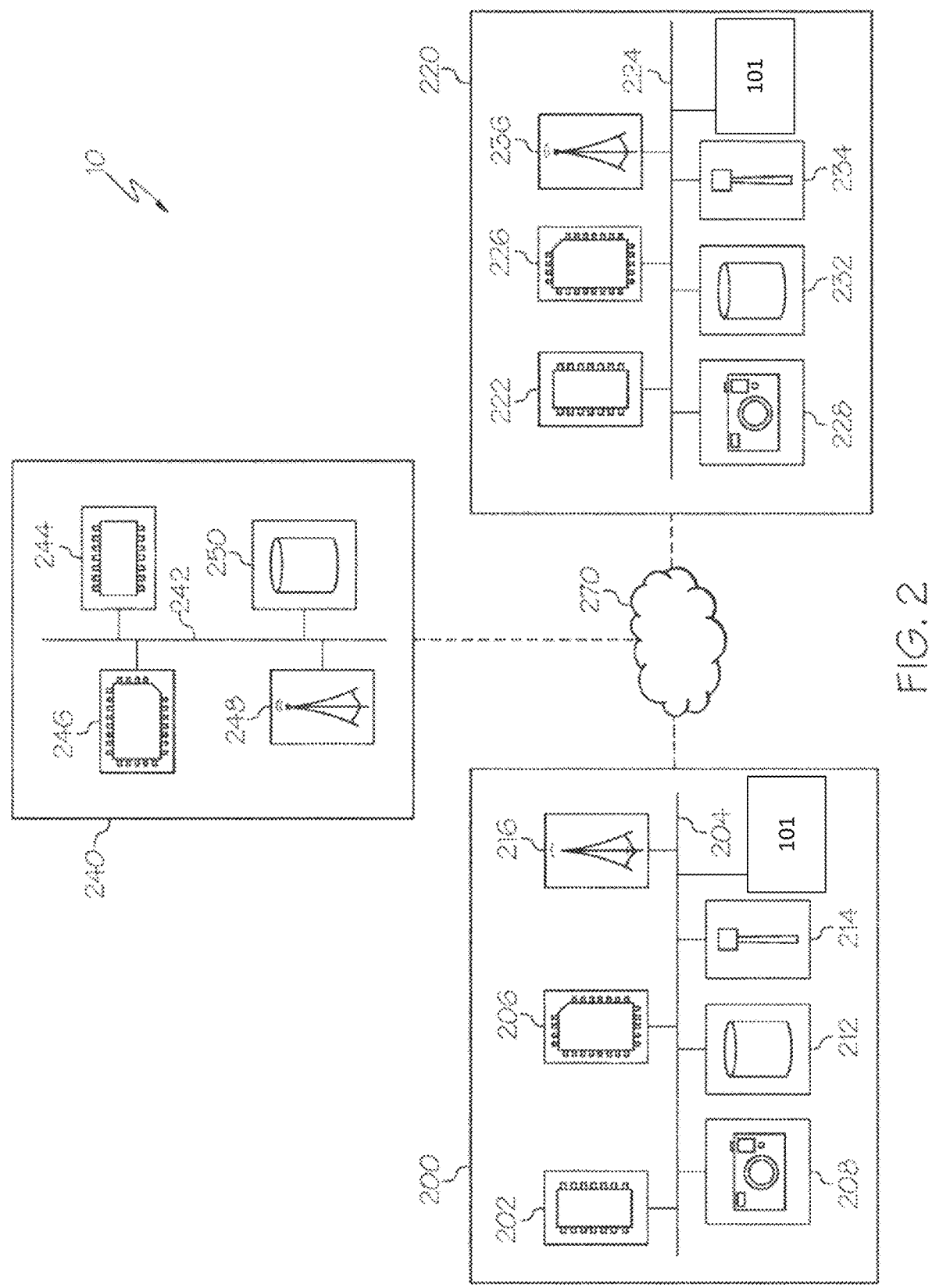
FIG. 2 depicts a schematic diagram of a system for classifying driving behavior of a target vehicle, according to one or more embodiments shown and described herein.

FIG. 2 depicts a schematic diagram of a system for classifying driving behavior of a target vehicle, according to one or more embodiments shown and described herein. The system includes an ego vehicle system 200, a target vehicle system 220, and a server 240.

It is noted that, while FIG. 2 depicts that the ego vehicle system 200 communicates with one target vehicle system 220, the ego vehicle system 200 may communicate with more than one target vehicle system 220. In embodiments, each of the ego vehicle system 200 and the target vehicle system 220 may be included within a vehicle that may be an automobile or any other passenger or non-passenger vehicle such as, a terrestrial, aquatic, and/or airborne vehicle. In some embodiments, the vehicle may be an autonomous vehicle that navigates its environment with limited human input or without human input.

The ego vehicle system 200 includes one or more processors 202. Each of the one or more processors 202 may be any device capable of executing machine-readable and executable instructions. Each of the one or more processors 202 may be a controller, an integrated circuit, a microchip, a computer, or any other computing device. The one or more processors 202 are coupled to a communication path 204 that provides signal interconnectivity between various modules of the system. The communication path 204 may communicatively couple any number of processors 202 with one another, and allow the modules coupled to the communication path 204 to operate in a distributed computing environment. Each of the modules may operate as a node that may send and/or receive data. As used herein, the term "communicatively coupled" means that coupled components are capable of exchanging data signals with one another such as, electrical signals via a conductive medium, electromagnetic signals via air, and optical signals via optical waveguides, and the like.

The communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. The communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. The communication path 204 may comprise a vehicle bus, such as a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine-readable and executable instructions such that the machine-readable and executable instructions can be accessed by the one or more processors 202. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory modules 206. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 202 along with the one or more memory modules 206 may operate as a controller for the ego vehicle system 200.

Still referring to FIG. 2, the ego vehicle system 200 includes one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of other vehicles such as the target vehicle 110 in FIGS. 1A and 1B, and/or the distance between the ego vehicle 100 and the target vehicle 110. The one or more sensors 208 may have any resolution. In some embodiments, one or more optical components, such as a mirror, fish-eye lens, or any other type of lens may be optically coupled to the one or more sensors 208. In embodiments, the one or more sensors 208 may provide image data to the one or more processors 202 or another component communicatively coupled to the communication path 204. In some embodiments, the one or more sensors 208 may provide navigation support. Data captured by the one or more sensors 208 may be used to autonomously or semi-autonomously navigate the ego vehicle 100.

In some embodiments, the one or more sensors 208 include one or more imaging sensors configured to operate in the visual and/or infrared spectrum to sense visual and/or infrared light. In some embodiments, the one or more sensors 208 include one or more LIDAR sensors, radar sensors, sonar sensors, or other types of sensors for gathering data that could be integrated into or supplement the data collection described herein. Ranging sensors like radar sensors may be used to obtain rough depth and speed information for the view of the ego vehicle system 200.

The ego vehicle system 200 includes a satellite antenna 214 coupled to the communication path 204 such that the communication path 204 communicatively couples the satellite antenna 214 to other modules of the ego vehicle system 200. The satellite antenna 214 is configured to receive signals from global positioning system satellites. In one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The ego vehicle system 200 includes one or more vehicle sensors 212. Each of the one or more vehicle sensors 212 are coupled to the communication path 204 and communicatively coupled to the one or more processors 202. The one or more vehicle sensors 212 may include one or more motion sensors for detecting and measuring motion and changes in the motion of the ego vehicle 100 or the target vehicle 110. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. Based on the signal indicative of an orientation, a rotation, a velocity, or an acceleration of the target vehicle 110, the ego vehicle system 200 may identify driving behavior of the target vehicle 110.

Still referring to FIG. 2, the ego vehicle system 200 includes network interface hardware 216 for communicatively coupling the ego vehicle system 200 to the target vehicle system 220. The network interface hardware 216 may be communicatively coupled to the communication path 204 and can be any device capable of transmitting and/or receiving data via a network. The network interface hardware 216 can include a communication transceiver for sending and/or receiving any wired or wireless communication. In embodiments, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the ego vehicle system 200 may transmit its data to the target vehicle system 220. In embodiments, the network interface hardware 216 of the ego vehicle system 200 may transmit vehicle data, location data, maneuver data and the like to other target vehicles, a cloud server, edge servers, and the like.

The ego vehicle system 200 may connect with one or more external vehicle systems (e.g., the target vehicle system 220) and/or external processing devices (e.g., a cloud server, or an edge server) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The ego vehicle system 200 may communicate with external communicate vehicle systems using wireless messages such as basic safety messages (BSMs), maneuver messages (MMs), and the like. BSM is a wireless message transmitted between vehicles where the transmitter sends its position, speed, and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

In embodiments, vehicles may function as infrastructure nodes to form a mesh network and connect dynamically on an ad-hoc basis. Vehicles may enter and/or leave the network at will, such that the mesh network may self-organize and self-modify over time. In embodiments, vehicles form peer-to-peer networks with other vehicles or utilize centralized networks that rely upon certain vehicles and/or infrastructure elements. Still, other examples include networks using centralized servers and other central computing devices to store and/or relay information between vehicles.

Still referring to FIG. 2, the ego vehicle system 200 may be communicatively coupled to the target vehicle system 220 or the server 240 by the network 270. In one embodiment, the network 270 may include one or more computer networks (e.g., a personal area network, a local area network, or a wide area network), cellular networks, satellite networks, and/or a global positioning system and combinations thereof. The ego vehicle system 200 may be communicatively coupled to the network 270 via a wide area network, via a local area network, via a personal area network, via a cellular network, via a satellite network, etc. In embodiments, local area networks may include wired Ethernet and/or wireless technologies such as, for example, Wi-Fi. In embodiments, personal area networks may include wireless technologies such as, for example, IrDA, Bluetooth®, Wireless USB, Z-Wave, ZigBee, and/or other near field communication protocols. In embodiments, cellular networks include, but are not limited to, technologies such as LTE, WiMAX, UMTS, CDMA, and GSM.

Still referring to FIG. 2, the target vehicle system 220 includes one or more processors 222, one or more memory modules 226, one or more sensors 228, one or more vehicle sensors 232, a satellite antenna 234, a network interface hardware 236, and a communication path 224 communicatively connected to the other components of the target vehicle system 220. The components of the target vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, and the network interface hardware 236 corresponds to the network interface hardware 216).

Still referring to FIG. 2, the server 240 includes one or more processors 244, one or more memory modules 246, a network interface hardware 248, one or more vehicle sensors 250, and a communication path 242 communicatively connected to the other components of the ego vehicle system 200 and/or the other components of the target vehicle system 220. The components of the server 240 may be structurally similar to and have similar functions as the corresponding components of the target vehicle system 220 (e.g., the one or more processors 244 corresponds to the one or more processors 222, the one or more memory modules 246 corresponds to the one or more memory modules 226, the one or more vehicle sensors 250 corresponds to the one or more vehicle sensors 232, the communication path 242 corresponds to the communication path 224, and the network interface hardware 248 corresponds to the network interface hardware 236). In embodiments, the server 240 may collect driving data of the target vehicle 110 as depicted in FIGS. 1A and 1B from the ego vehicle system 200 or the target vehicle system 220, generate tags representing driving behavior of the target vehicle 110, interprets the tags, and classify driving behavior of the target vehicle 110 based on interpretation of the tags. In some embodiments, the server 240 may receive tags generated by the ego vehicle system 200.

It should be understood that the components illustrated in FIG. 2 are merely illustrative and are not intended to limit the scope of this disclosure. More specifically, while the components in FIG. 2 are illustrated as residing within the ego vehicle system 200, the target vehicle system 220, or both, this is a non-limiting example. In some embodiments, one or more of the components may reside external to the ego vehicle system 200, the target vehicle system 220, or both, such as with the server 240.

Figure 3A:
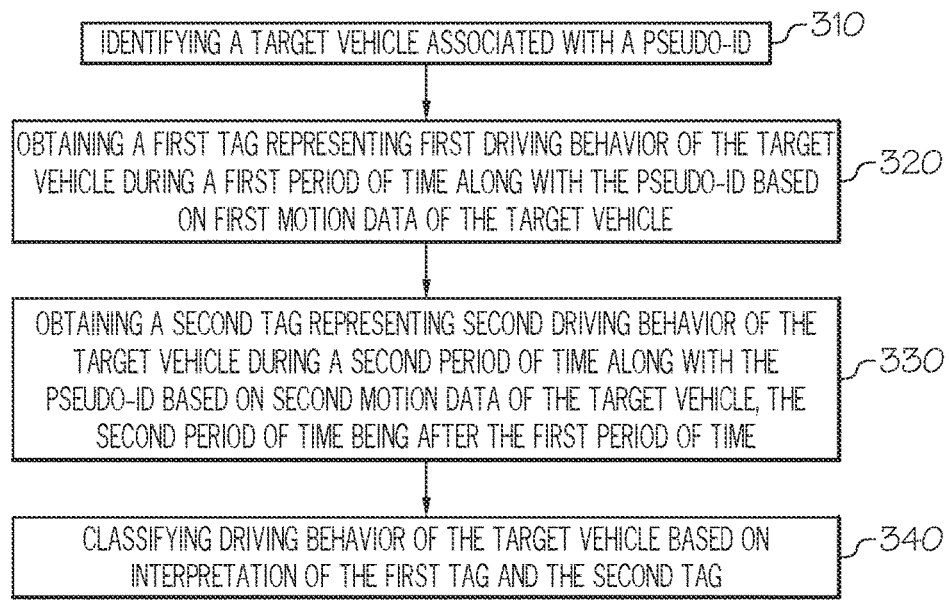
FIGS. 3A and 3B depict a flowchart for a method of classify driving behavior of a target vehicle, according to one or more embodiments shown and described herein.

Referring now to FIG. 3A, a flowchart of a method that may be performed by the ego vehicle 100, the target vehicle 110, the server 240, or combinations thereof of FIGS. 1A, 1B, and 2 is depicted.

In step 310, a controller identifies a target vehicle associated with a pseudo-id. The controller may be the controller of the ego vehicle or the controller of the server. In some embodiments, the controller may be the controller of another vehicle 620 as depicted in FIG. 6B. By referring to FIG. 1A, the controller identifies the target vehicle 110 associated with a pseudo-id. The pseudo-id may include one or more features of the target vehicle 110. The one or more features may include a color, a model, and a type of the target vehicle 110.

Referring back to FIG. 3A, in step 320, the controller obtains a first tag representing first driving behavior of the target vehicle during a first period of time along with the pseudo-id based on first motion data of the target vehicle. By referring to FIG. 1A, the first tag T1 representing first driving behavior of the target vehicle 110, e.g., nudging followed by changing lanes from a current lane to another lane, during a first period of time along with the pseudo-id based on first motion data of the target vehicle 110. The first motion data of the target vehicle 110 may be captured by the one or more sensors of the ego vehicle 100 disposed of rear-side of the ego vehicle 100.

Referring back to FIG. 3A, in step 330, the ego vehicle obtains a second tag representing second driving behavior of the target vehicle during a second period of time along with the pseudo-id based on second motion data of the target vehicle. By referring to FIG. 1B, the second tag T2 representing second driving behavior of the target vehicle 110, e.g., nudging followed by frequent lane changes, during a second period of time along with the pseudo-id based on second motion data of the target vehicle 110. The second motion data of the target vehicle 110 may be captured by the one or more sensors of the ego vehicle 100 disposed of rear-side of the ego vehicle 100. By referring to FIG. 4B, the second tag T2 representing second driving behavior of the target vehicle 410, e.g., short-term lane swerving, during a second period of time along with the pseudo-id based on second motion data of the target vehicle 410. The second motion data of the target vehicle 410 may be captured by the one or more sensors of the ego vehicle 400 disposed of rear-side of the ego vehicle 400. By referring to FIG. 5B, the second tag T2 representing second driving behavior of the target vehicle 510, e.g., nudging followed by cut-in lane, during a second period of time along with the pseudo-id based on second motion data of the target vehicle 510. The second motion data of the target vehicle 510 may be captured by the one or more sensors of the ego vehicle 500 disposed of front-side of the ego vehicle 500. By referring to FIG. 6B, the second tag T2 representing second driving behavior of the target vehicle 610, e.g., weaving in a lane, during a second period of time along with the pseudo-id based on second motion data of the target vehicle 610. The second motion data of the target vehicle 610 may be captured by the one or more sensors of another vehicle 620 disposed of rear-side of another vehicle 620.

Referring back to FIG. 3A, in step 340, the controller classifies driving behavior of the target vehicle based on interpretation of the first tag and the second tag. The driving behavior of the target vehicle 110 includes the first driving behavior of the target vehicle 110 and the second driving behavior of the target vehicle 110. The controller classifies the driving behavior of the target vehicle 110 as abnormal driving behavior in response to determining that each of the first tag and the second tag matches with one of predetermined movement patterns. In some embodiments, when the two tags are not enough to classify the driving behavior of the target vehicle 110 as abnormal driving behavior, the controller may dynamically adjust the number of tags for identifying abnormal driving behavior and obtain at least one additional tag representing additional driving behavior of the target vehicle 110. For example, when there is an accident in the left-most lane, the target vehicle 110 may first decelerate harsh and then change lanes. These driving behaviors include two tags each of which matches with predetermined movement patterns and then be classified as abnormal behavior. However, these driving behaviors of the driver of the target vehicle 110 may be normal. In this case, the controller may dynamically adjust the number of tags and obtain at least one additional tag representing additional driving behavior of the target vehicle 110. By referring to FIGS. 1A and 1B, the first tag T1 matches with the predetermined movement pattern, e.g., nudging followed by changing lanes from a current lane to another lane, and the second tag T2 matches with the predetermined movement pattern, e.g., nudging followed by frequent lane changes. In response to matching the first tag T1 and the second tag T2 with the predetermined movement patterns, the controller classifies the driving behavior of the target vehicle 110 as abnormal driving behavior. By referring to FIGS. 4A and 4B, the first tag T1 matches with the predetermined movement pattern, e.g., nudging followed by changing lanes from a current lane to another lane, and the second tag T2 matches with the predetermined movement pattern, e.g., short-term lane swerving. In response to matching the first tag T1 and the second tag T2 with the predetermined movement patterns, the controller classifies the driving behavior of the target vehicle 410 as abnormal driving behavior. By referring to FIGS. 5A and 5B, the first tag T1 matches with the predetermined movement pattern, e.g., nudging followed by changing lanes from a current lane to another lane, and the second tag T2 matches with the predetermined movement pattern, e.g., nudging followed by cut-in lane. In response to matching the first tag T1 and the second tag T2 with the predetermined movement patterns, the controller classifies the driving behavior of the target vehicle 510 as abnormal driving behavior. By referring to FIGS. 6A and 6B, the first tag T1 matches with the predetermined movement pattern, e.g., nudging followed by changing lanes from a current lane to another lane, and the second tag T2 matches with the predetermined movement pattern, e.g., weaving in a lane. In response to matching the first tag T1 and the second tag T2 with the predetermined movement patterns, the controller in the ego vehicle 600, the controller in another vehicle 620, or both classify the driving behavior of the target vehicle 610 as abnormal driving behavior.

Referring back to FIG. 3A, the controller outputs an alert about the target vehicle in response to classifying the driving behavior of the target vehicle as abnormal driving behavior. In embodiments, the controller may instruct a display of an output device of the vehicle, a display of a device of the driver, or both, to display the driving behavior of the target vehicle as abnormal driving behavior. In embodiments, the output device of the vehicle, the device of the driver, or both, may include a smartphone, a smartwatch, a laptop, a tablet computer, a personal computer, and a wearable device, or combinations thereof. In embodiments, the controller may instruct a device of the target vehicle to output the alert about the target vehicle in response to classifying the driving behavior of the target vehicle as abnormal driving behavior.

Figure 3B:
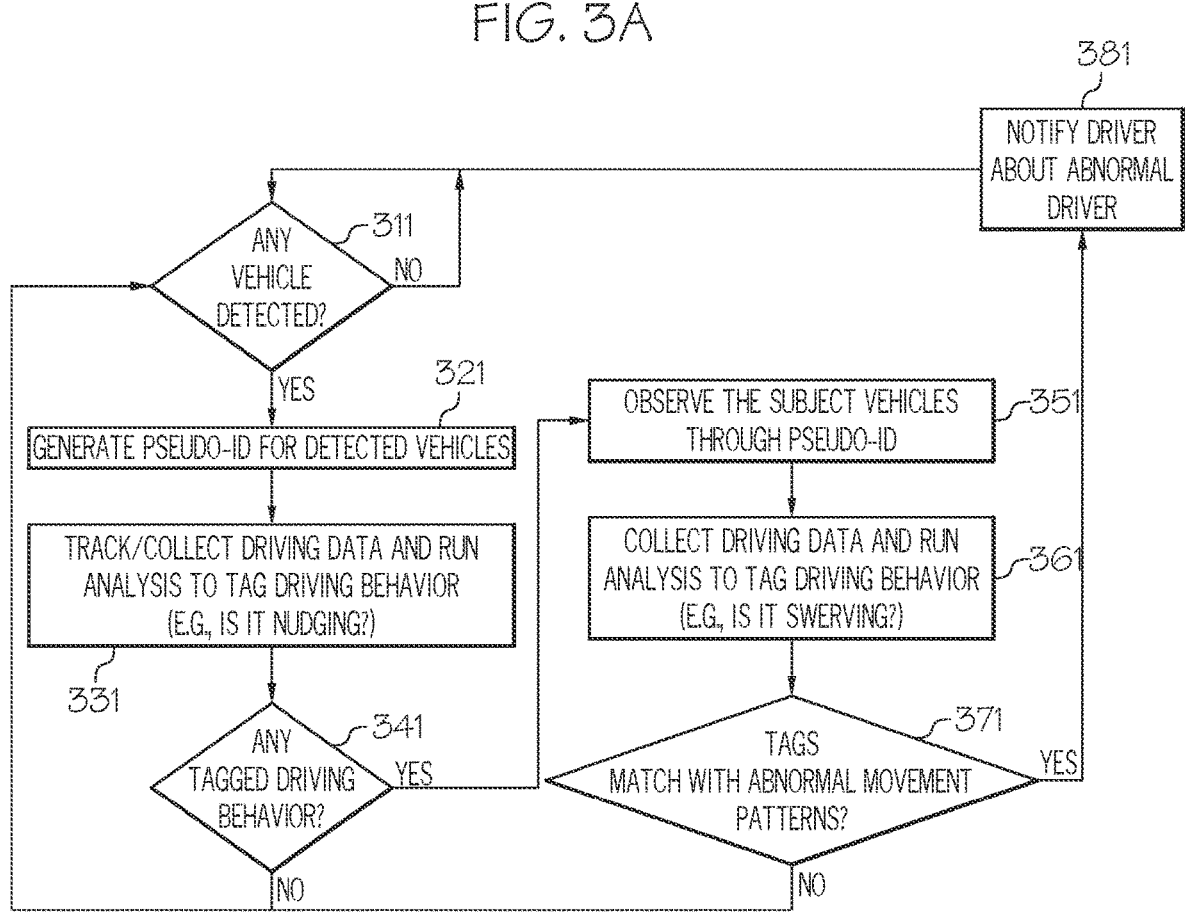

Referring now to FIG. 3B, a flowchart of a method that may be performed by the ego vehicle 100, the target vehicle 110, the server 240, or combinations thereof of FIGS. 1A, 1B, and 2 is depicted.

In step 311, a controller detects any vehicle. Any vehicle may be the target vehicle. The controller may be the controller of the ego vehicle 100 or the controller of a server that the ego vehicle 100 communicates with.

In step 321, the controller generates a pseudo-id for the detected vehicle. The pseudo-id may include one or more features of the target vehicle. The one or more features may include a color, a model, and a type of the target vehicle.

In step 331, the controller tracks or collects driving data and runs an analysis to tag driving behavior. In some embodiments, the analysis may be a time-series analysis, a pattern matching algorithm, a machine learning algorithm, or combinations thereof. In step 331, the controller may track or collect driving data and run an analysis to tag first driving behavior of the target vehicle. By referring to FIG. 1A, the controller may track or collect driving data and run an analysis to tag first driving behavior of the target vehicle 110, e.g., nudging followed by changing lanes from a current lane to another lane. The driving data may include first motion data of the target vehicle 110. The first motion data of the target vehicle 110 may be captured by the one or more sensors of the ego vehicle 100 disposed of rear-side of the ego vehicle 100.

In step 341, the controller determines if there is any tagged driving behavior. In some embodiments, the controller determines if the first tag matches the predetermined movement patterns. In some embodiments, if the first tag matches the predetermined movement patterns, the controller concludes that there are tagged driving behaviors. By referring to FIG. 1A, the controller matches the first tag T1 with the predetermined movement pattern, e.g., nudging followed by changing lanes from a current lane to another lane.

In step 351, the controller observes the subject vehicle through the pseudo-id. After obtaining the first tag, the controller may keep identifying the target vehicle associated with the pseudo-id to obtain the second tag.

In step 361, the controller collects driving data and runs an analysis to tag driving behavior. In step 361, the controller may track or collect driving data and run an analysis to tag second driving behavior of the target vehicle. By referring to FIG. 1B, the controller may track or collect driving data and run an analysis to tag second driving behavior of the target vehicle 110, e.g., nudging followed by frequent lane changes. The driving data may include a second motion data of the target vehicle 110. The second motion data of the target vehicle 110 may be captured by the one or more sensors of the ego vehicle 100 disposed of rear-side of the ego vehicle 100. By referring to FIG. 4B, the controller may track or collect driving data and run an analysis to tag second driving behavior of the target vehicle 410, e.g., short-term lane swerving. The driving data may include second motion data of the target vehicle 410. The second motion data of the target vehicle 410 may be captured by the one or more sensors of the ego vehicle 400 disposed of rear-side of the ego vehicle 400. By referring to FIG. 5B, the controller may track or collect driving data and run an analysis to tag second driving behavior of the target vehicle 510, e.g., nudging followed by cut-in lane. The driving data may include second motion data of the target vehicle 510. The second motion data of the target vehicle 510 may be captured by the one or more sensors of the ego vehicle 500 disposed of front-side of the ego vehicle 500. By referring to FIG. 6B, the controller may track or collect driving data and run an analysis to tag second driving behavior of the target vehicle 610, e.g., weaving in a lane. The driving data may include second motion data of the target vehicle 610. The second motion data of the target vehicle 610 may be captured by the one or more sensors of another vehicle 620 disposed of rear-side of another vehicle 620.

The controller determines if there is any tagged driving behavior. In some embodiments, the controller determines if the second tag matches the predetermined movement patterns. In some embodiments, if the second tag matches the predetermined movement patterns, the controller concludes that there are tagged driving behaviors. By referring to FIG. 1B, the controller matches the second tag T2 with the predetermined movement pattern, e.g., nudging followed by frequent lane changes. By referring to FIG. 4B, the controller matches the second tag 12 with the predetermined movement pattern, e.g., short-term lane swerving. By referring to FIG. 5B, the controller matches the second tag T2 with the predetermined movement pattern, e.g., nudging followed by cut-in lane. By referring to FIG. 6B, the controller matches the second tag T2 with the predetermined movement pattern, e.g., weaving in a lane.

In step 371, the controller determines if tags match abnormal movement patterns. The controller classifies the driving behavior of the target vehicle 110 as abnormal driving behavior in response to determining that each of the first tag and the second tag matches with one of predetermined movement patterns. By referring to FIGS. 1A and 1B, the first tag T1 matches with the predetermined movement pattern, e.g., nudging followed by changing lanes from a current lane to another lane, and the second tag T2 matches with the predetermined movement pattern, e.g., nudging followed by frequent lane changes. In response to matching the first tag T1 and the second tag T2 with the predetermined movement patterns, the controller classifies the driving behavior of the target vehicle 110 as abnormal driving behavior. By referring to FIGS. 4A and 4B, the first tag T1 matches with the predetermined movement pattern, e.g., nudging followed by changing lanes from a current lane to another lane, and the second tag T2 matches with the predetermined movement pattern, e.g., short-term lane swerving. In response to matching the first tag T1 and the second tag T2 with the predetermined movement patterns, the controller classifies the driving behavior of the target vehicle 410 as abnormal driving behavior. By referring to FIGS. 5A and 5B, the first tag T1 matches with the predetermined movement pattern, e.g., nudging followed by changing lanes from a current lane to another lane, and the second tag T2 matches with the predetermined movement pattern, e.g., nudging followed by cut-in lane. In response to matching the first tag T1 and the second tag T2 with the predetermined movement patterns, the controller classifies the driving behavior of the target vehicle 510 as abnormal driving behavior. By referring to FIGS. 6A and 6B, the first tag T1 matches with the predetermined movement pattern, e.g., nudging followed by changing lanes from a current lane to another lane, and the second tag T2 matches with the predetermined movement pattern, e.g., weaving in a lane. In response to matching the first tag T1 and the second tag T2 with the predetermined movement patterns, the controller in the ego vehicle 600, the controller in another vehicle 620, or both classify the driving behavior of the target vehicle 610 as abnormal driving behavior.

In step 381, the controller notifies a driver of the ego vehicle about abnormal driver of the target vehicle. In some embodiments, the ego vehicle may inform a server, e.g. a remote server, about abnormal driver of the target vehicle. The ego vehicle may share its observations of the target vehicle along with the pseudo-id for the target vehicle. The server may initiate anomaly management and inform a driver of the ego vehicle, innocent drivers of other vehicles, or both, ahead of or following the target vehicle. In some embodiments, the controller outputs an alert about the target vehicle in response to classifying the driving behavior of the target vehicle as abnormal driving behavior. In embodiments, the controller may instruct a display of an output device of the vehicle, a display of a device of the driver, or both, to display the driving behavior of the target vehicle as abnormal driving behavior. In embodiments, the output device of the vehicle, the device of the driver, or both, may include a smartphone, a smartwatch, a laptop, a tablet computer, a personal computer, and a wearable device, or combinations thereof. In embodiments, the controller may instruct a device of the target vehicle to output the alert about the target vehicle in response to classifying the driving behavior of the target vehicle as abnormal driving behavior.

Figure 4A:
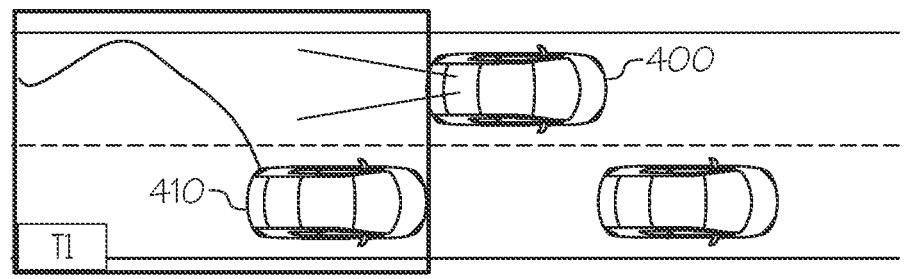
FIGS. 4A and 4B schematically depict an exemplary embodiment of classifying driving behavior of a target vehicle where the first driving behavior of a target vehicle is related to nudging followed by changing lanes and the second driving behavior of a target vehicle is related to short-term lane swerving, according to one or more embodiments shown and described herein.
Figure 4B:
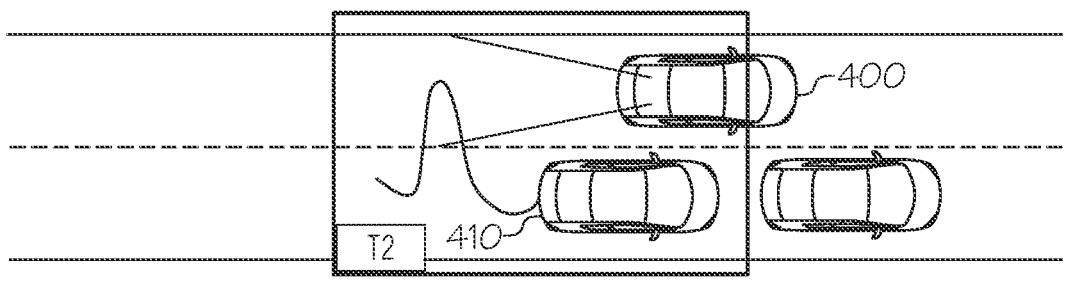

FIGS. 4A and 4B schematically depict an exemplary embodiment of classifying driving behavior of a target vehicle where the first driving behavior of a target vehicle is related to nudging followed by changing lanes and the second driving behavior of a target vehicle is related to short-term lane swerving.

Referring to FIGS. 4A and 4B, the target vehicle 410 may identify a target vehicle 410 associated with a pseudo-id. In embodiments, the pseudo-id may include one or more features of the target vehicle 410, e.g., a color, a model, and a type of the target vehicle 410. Referring to FIG. 4A, the ego vehicle 400 obtains the first tag T1 representing first driving behavior of the target vehicle 410 during a first period of time along with the pseudo-id based on first motion data of the target vehicle 410. The first driving behavior of the target vehicle 410 may be related to nudging followed by changing lanes from a current lane to another lane. The first motion data of the target vehicle 410 may be captured by the one or more sensors of the ego vehicle 400 disposed of rear-side of the ego vehicle 400. Referring to FIG. 4B, the ego vehicle 400 obtains the second tag T2 representing second driving behavior of the target vehicle 410 during a second period of time along with the pseudo-id based on second motion data of the target vehicle 410. The second driving behavior of the target vehicle 410 may be related to short-term lane swerving. The second motion data of the target vehicle 410 may be captured by the one or more sensors of the ego vehicle 400 disposed of rear-side of the ego vehicle 400.

Referring back to FIGS. 4A and 4B, the ego vehicle 400 classifies driving behavior of the target vehicle 410 based on interpretation of the first tag T1 and the second tag T2. The predetermined movement patterns may include nudging followed by changing lanes and short-term lane swerving. The first tag T1 matches the predetermined movement pattern, nudging followed by changing lanes. The second tag T2 matches the predetermined movement pattern, short-term lane swerving. In response to matching the first tag T1 and the second tag T2 with the predetermined movement patterns, the ego vehicle 400 may classify the driving behavior of the target vehicle 410 as abnormal driving behavior.

Figure 5A:
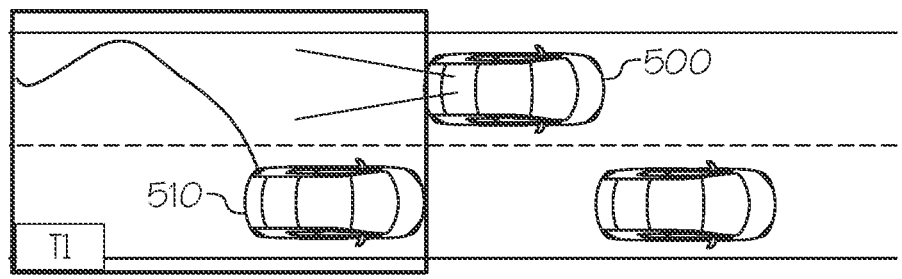
FIGS. 5A and 5B schematically depict an exemplary embodiment of classifying driving behavior of a target vehicle where the first driving behavior of a target vehicle is related to nudging followed by changing lanes and the second driving behavior of a target vehicle is related to nudging followed by cut-in lane, according to one or more embodiments shown and described herein.
Figure 5B:
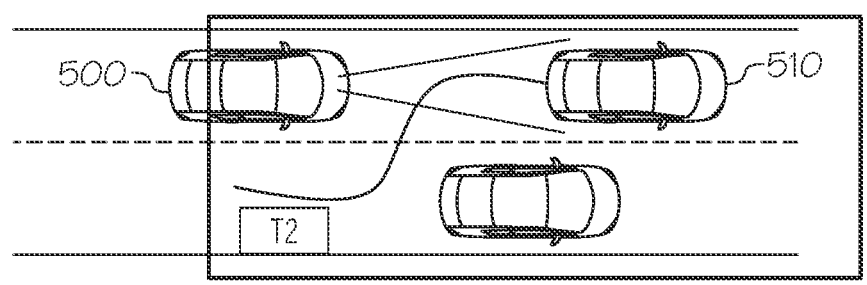

FIGS. 5A and 5B schematically depict an exemplary embodiment of classifying driving behavior of a target vehicle where the first driving behavior of a target vehicle is related to nudging followed by changing lanes and the second driving behavior of a target vehicle is related to nudging followed by cut-in lane.

Referring to FIGS. 5A and 5B, the target vehicle 510 may identify a target vehicle 510 associated with a pseudo-id. In embodiments, the pseudo-id may include one or more features of the target vehicle 510, e.g., a color, a model, and a type of the target vehicle 510. Referring to FIG. 5A, the ego vehicle 500 obtains the first tag T1 representing first driving behavior of the target vehicle 510 during a first period of time along with the pseudo-id based on first motion data of the target vehicle 510. The first driving behavior of the target vehicle 510 may be related to nudging followed by changing lanes from a current lane to another lane. The first motion data of the target vehicle 510 may be captured by the one or more sensors of the ego vehicle 500 disposed of rear-side of the ego vehicle 500. Referring to FIG. 5B, the ego vehicle 500 obtains the second tag T2 representing second driving behavior of the target vehicle 510 during a second period of time along with the pseudo-id based on second motion data of the target vehicle 510. The second driving behavior of the target vehicle 510 may be related to nudging followed by cut-in lane. The second motion data of the target vehicle 510 may be captured by the one or more sensors of the ego vehicle 500 disposed of front-side of the ego vehicle 500.

Referring back to FIGS. 5A and 5B, the ego vehicle 500 classifies driving behavior of the target vehicle 510 based on interpretation of the first tag T1 and the second tag T2. The predetermined movement patterns may include nudging followed by changing lanes and nudging followed by cut-in lane. The first tag T1 matches the predetermined movement pattern, nudging followed by changing lanes. The second tag T2 matches the predetermined movement pattern, nudging followed by cut-in lane. In response to matching the first tag T1 and the second tag T2 with the predetermined movement patterns, the ego vehicle 500 may classify the driving behavior of the target vehicle 510 as abnormal driving behavior.

Figure 6A:
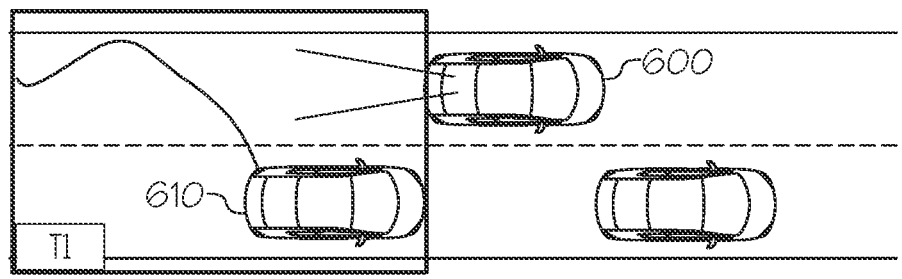
FIGS. 6A and 6B schematically depict an exemplary embodiment of classifying driving behavior of a target vehicle where the first driving behavior of a target vehicle is related to nudging followed by changing lanes and the second driving behavior of a target vehicle is related to weaving in a lane, according to one or more embodiments shown and described herein.
Figure 6B:
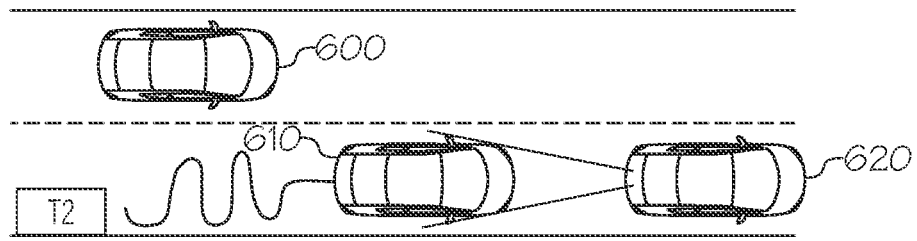

FIGS. 6A and 6B schematically depict an exemplary embodiment of classifying driving behavior of a target vehicle where the first driving behavior of a target vehicle is related to nudging followed by changing lanes and the second driving behavior of a target vehicle is related to weaving in a lane.

Referring to FIGS. 6A and 6B, the target vehicle 610 may identify a target vehicle 610 associated with a pseudo-id. In embodiments, the pseudo-id may include one or more features of the target vehicle 610, e.g., a color, a model, and a type of the target vehicle 610. Referring to FIG. 6A, the ego vehicle 600 obtains the first tag T1 representing first driving behavior of the target vehicle 610 during a first period of time along with the pseudo-id based on first motion data of the target vehicle 610. The first driving behavior of the target vehicle 610 may be related to nudging followed by changing lanes from a current lane to another lane. The first motion data of the target vehicle 610 may be captured by the one or more sensors of the ego vehicle 600 disposed of rear-side of the ego vehicle 600. Referring to FIG. 6B, the ego vehicle 600 obtains the second tag T2 representing second driving behavior of the target vehicle 610 during a second period of time along with the pseudo-id based on second motion data of the target vehicle 610. The second driving behavior of the target vehicle 610 may be related to weaving in a lane.

In some embodiments, the second motion data of the target vehicle 610 may be captured by the one or more sensors of another vehicle 620 disposed of front-side of another vehicle 620. In some embodiments, the one or more sensors may be disposed of rear-side of another vehicle 620. In this case, the ego vehicle 600 may transmit the first tag T1 to another vehicle 620 via wireless communication, e.g., vehicle-to-vehicle communication. Another vehicle 620 may also transmit the second tag T2 to the ego vehicle 600 vie wireless communication.

Referring back to FIGS. 6A and 6B, the ego vehicle 600, another vehicle 620, or both, classify driving behavior of the target vehicle 610 based on interpretation of the first tag T1 and the second tag T2. The predetermined movement patterns may include nudging followed by changing lanes and weaving in a lane. The first tag T1 matches the predetermined movement pattern, nudging followed by changing lanes. The second tag T2 matches the predetermined movement pattern, weaving in a lane. In response to matching the first tag T1 and the second tag T2 with the predetermined movement patterns, the ego vehicle 600, another vehicle 620, or both, may classify the driving behavior of the target vehicle 610 as abnormal driving behavior.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprising:
a controller programmed to:
identify a target vehicle associated with a pseudo-id, the pseudo-id including one or more features of the target vehicle, the one or more features including a color, a model, and a type of the target vehicle;
obtain a first tag representing first driving behavior of the target vehicle during a first period of time along with the pseudo-id based on first motion data of the target vehicle;
obtain a second tag representing second driving behavior of the target vehicle during a second period of time along with the pseudo-id based on second motion data of the target vehicle, the second period of time being after the first period of time; and classify driving behavior of the target vehicle based on interpretation of the first tag and the second tag, wherein the controller is further programmed to:

classify the driving behavior of the target vehicle as abnormal driving behavior in response to determining that each of the first tag and the second tag matches with one of predetermined movement patterns, output an alert about the target vehicle in response to classifying the driving behavior of the target vehicle as abnormal driving behavior, provide, in response to the output alert, driving behavior information to an ego vehicle, and control an actuator of the ego vehicle to move the ego vehicle to avoid a vehicle collision with the target vehicle based on the output alert, the driving behavior information, and a first signal.

2. The system of claim 1, wherein the predetermined movement patterns include nudging followed by lane changes, nudging followed by cutting-in lane, nudging followed by another nudging, having a long distance to collision followed by a short distance to collision, frequent lane changes, weaving in a lane, and short-term lane swerving.

3. The system of claim 1, wherein:
the first motion data of the target vehicle is captured by one or more sensors of the ego vehicle;
the first tag representing the first driving behavior of the target vehicle is generated based on the first motion data by the ego vehicle;
the second motion data of the target vehicle is captured by the one or more sensors of the ego vehicle;
the second tag representing the second driving behavior of the target vehicle is generated based on the second motion data by the ego vehicle; and
the target vehicle includes an actuator that is configured to move the target vehicle in accordance with a second signal.

4. The system of claim 3, wherein each of the target vehicle and the ego vehicle are configured to respectively transmit information of a current location and a destination.

5. The system of claim 1, wherein:
the first motion data of the target vehicle is captured by one or more sensors of the ego vehicle;
the first tag representing the first driving behavior of the target vehicle is generated based on the first motion data by the ego vehicle;
the second motion data of the target vehicle is captured by one or more sensors of another vehicle;
the second tag representing the second driving behavior of the target vehicle is generated based on the second motion data by the another vehicle; and
the target vehicle includes an actuator that is configured to move the target vehicle in accordance with a second signal.

6. The system of claim 5, wherein:
the ego vehicle transmits the first tag to the another vehicle; and
a controller of the another vehicle is programmed to classify the driving behavior of the target vehicle based on the interpretation of the first tag and the second tag.

7. The system of claim 1, wherein the controller is further programmed to:
determine that the first tag and the second tag are insufficient to classify the driving behavior as the abnormal driving behavior; and
dynamically adjust, in response to the determination, a number of the tags to identify the abnormal driving behavior and obtain at least one additional tag representing additional driving behavior.

8. A method for classifying driving behavior of a target vehicle, the method comprising:
identifying a target vehicle associated with a pseudo-id, the pseudo-id including one or more features of the target vehicle, the one or more features including a color, a model, and a type of the target vehicle;
obtaining a first tag representing first driving behavior of the target vehicle during a first period of time along with the pseudo-id based on first motion data of the target vehicle;
obtaining a second tag representing second driving behavior of the target vehicle during a second period of time along with the pseudo-id based on second motion data of the target vehicle, the second period of time being after the first period of time;
classifying driving behavior of the target vehicle based on interpretation of the first tag and the second tag;
classifying the driving behavior of the target vehicle as abnormal driving behavior in response to determining that each of the first tag and the second tag matches with one of predetermined movement patterns;
outputting an alert about the target vehicle in response to classifying the driving behavior of the target vehicle as abnormal driving behavior;
providing, in response to the output alert, driving behavior information to an ego vehicle; and
controlling an actuator of the ego vehicle to move the ego vehicle to avoid a vehicle collision with the target vehicle based on the output alert, the driving behavior information, and a first signal.

9. The method of claim 8, wherein the predetermined movement patterns include nudging followed by lane changes, nudging followed by cutting-in lane, nudging followed by another nudging, having a long distance to collision followed by a short distance to collision, frequent lane changes, weaving in a lane, and short-term lane swerving.

10. The method of claim 8, further comprising:
obtaining the first motion data of the target vehicle by one or more sensors of the ego vehicle;
generating the first tag representing the first driving behavior of the target vehicle based on the first motion data by the ego vehicle;
obtaining the second motion data of the target vehicle by one or more sensors of the ego vehicle;
generating the second tag representing the second driving behavior of the target vehicle based on the second motion data by the ego vehicle; and
moving the target vehicle via an actuator of the target vehicle in accordance with a second signal.

11. The method of claim 8, further comprising:
obtaining the first motion data of the target vehicle by one or more sensors of the ego vehicle;
generating the first tag representing the first driving behavior of the target vehicle based on the first motion data by the ego vehicle;
obtaining the second motion data of the target vehicle by one or more sensors of another vehicle;
generating the second tag representing the second driving behavior of the target vehicle based on the second motion data by the another vehicle; and
moving the target vehicle via an actuator of the target vehicle in accordance with a second signal.

12. The method of claim 11, further comprising:

transmitting, by the ego vehicle, the first tag to the another vehicle.

13. A vehicle comprising:

an actuator configured to move the vehicle in accordance with a first signal;

one or more sensors configured to detect a target vehicle; and a controller programmed to:

identify the target vehicle with a pseudo-id, the pseudo-id including one or more features of the target vehicle, the one or more features including a color, a model, and a type of the target vehicle;

obtain a first tag representing first driving behavior of the target vehicle during a first period of time along with the pseudo-id based on first motion data of the target vehicle;

obtain a second tag representing second driving behavior of the target vehicle during a second period of time along with the pseudo-id based on second motion data of the target vehicle, the second period of time being after the first period of time;

classify driving behavior of the target vehicle based on interpretation of the first tag and the second tag;

classify the driving behavior of the target vehicle as abnormal driving behavior in response to determining that each of the first tag and the second tag matches with one of predetermined movement patterns;

output an alert about the target vehicle in response to classifying the driving behavior of the target vehicle as abnormal driving behavior;

provide, in response to the output alert, driving behavior information to the vehicle; and control the actuator of the vehicle to move the vehicle to avoid a vehicle collision with the target vehicle based on the output alert, the driving behavior information, and the first signal.

14. The vehicle of claim 13, wherein the predetermined movement patterns include nudging followed by lane changes, nudging followed by cutting-in lane, nudging followed by another nudging, having a long distance to collision followed by a short distance to collision, frequent lane changes, weaving in a lane, and short-term lane swerving.

* * * * *